Patented Jan. 23, 1940

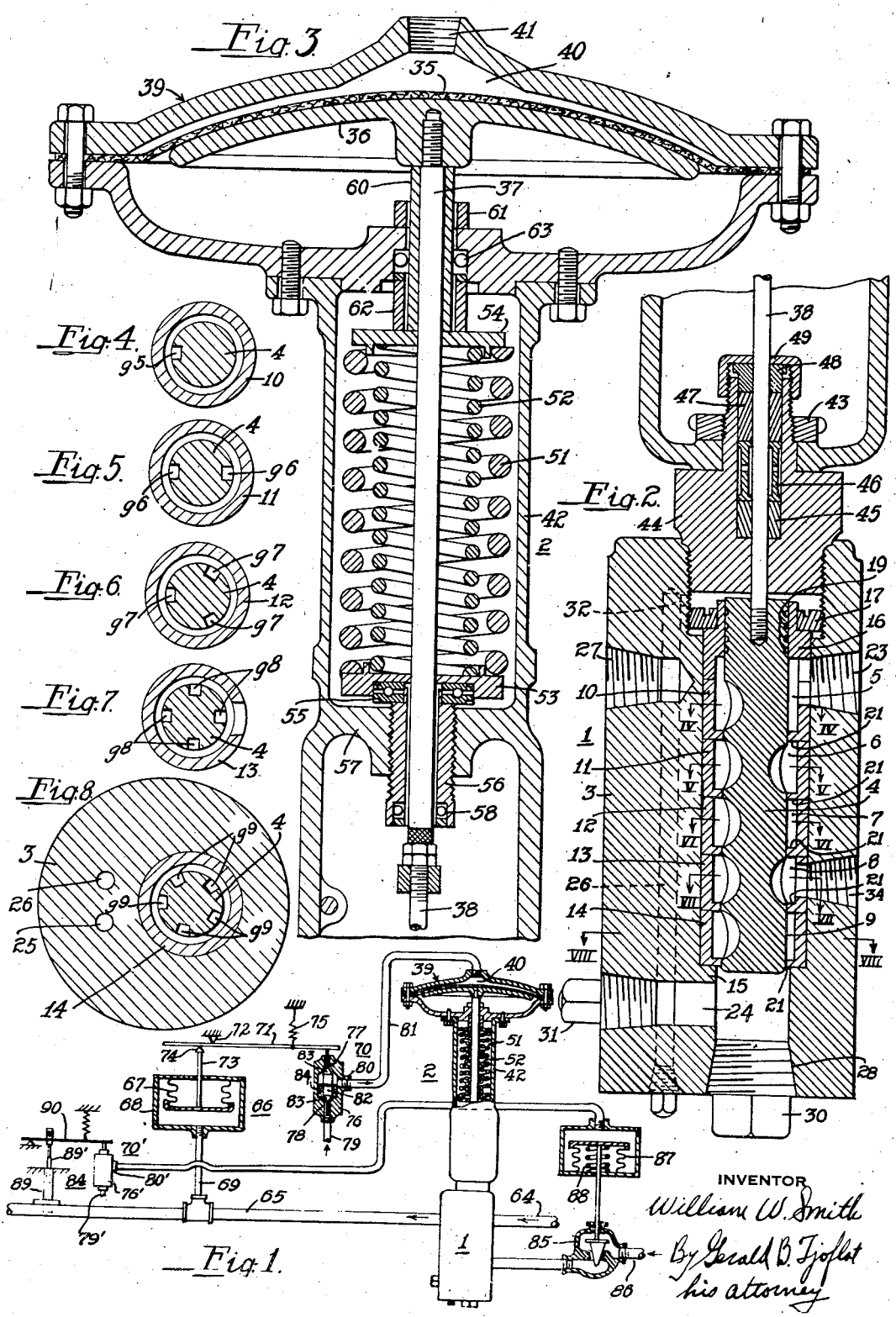

2,187,811

UNITED STATES PATENT OFFICE 2,187,811

FLUID PRESSURE REDUCING VALVE

William W. Smith, East Orange, N. J.

Application January 6, 1938, Serial No. 183,651

6 Claims. (Cl. 251—27)

This invention relates to fluid pressure-reducing valves and an object of the invention is to provide a valve that will be simple in construction, efficient and substantially noiseless in operation, and have long life.

Another object of the invention is to provide a fluid pressure-reducing valve that will effect pressure reduction in a plurality of stages, and maintain a predetermined relationship between the reductions at the various stages.

A further object of the invention is to provide a multi-stage fluid pressure reducing valve of such character that by design the pressure drop effected by each stage will be of such value that the velocity of flow, for any given fluid, from one stage to another will be below the value that would set up noise and vibration, and the pressure drop through one stage will always bear a definite relationship to the drop through any other stage.

A still further object of the invention is to provide a multi-stage fluid pressure reducing valve that will in effect be like a plurality of valves connected in series, i. e., the outlet of one connected to the inlet of the next, etc., and provided with a common control means whereby the flow areas of all the valves will always remain fixed with respect to one another.

And a further object of the invention is to provide a valve of the character referred to above that shall be operable in water, oil, steam and gas lines, and, in the case of steam lines, be adaptable for desuperheating purposes.

Other objects of the invention will, in part, be apparent and will, in part, be obvious from the following description taken in conjunction with the accompanying drawing in which:

Fig. 1 is a more or less diagrammatic view of a valve embodying one form of the invention, shown in connection with a steam line for reducing high pressure steam to low pressure steam, means being illustrated for desuperheating the steam entering the low pressure line and controlling the temperature thereof, and for controlling the valve to maintain the pressure of the low pressure steam constant at some predetermined value.

Fig. 2 is a view in section of the lower portion of the valve shown in Fig. 1;

Fig. 3 is a view in section of the upper portion of the valve shown in Fig. 1, Figs. 2 and 3 together representing a view in section of the entire valve assembly; and Figs. 4 to 8, inclusive, are views in section taken on lines IV—IV to VIII—VIII, inclusive, Fig. 2, showing the construction of the valve at the various pressure-reducing stages.

Throughout the drawing and the specification like reference characters indicate like parts.

The pressure-reducing valve assembly illustrated in the drawing, comprises the valve proper 1 and the valve operating mechanism 2. The valve proper comprises a valve body 3, having a valve plug 4 therein for controlling the flow of fluid through a plurality of pressure-reducing stations or stages 5 to 9, inclusive, disposed in series.

The valve body is bored to receive a plurality of annular members or rings 10 to 14, inclusive, disposed one on top of the other. The lowermost annular member or ring 14 rests on a shoulder 15 at the bottom of the body bore and the upper ring is pressed downwardly by means of a packing ring 16 which is locked in place by means of ring nut 17 having threaded engagement with the upper enlarged portion of the bore of the valve body. The upper end of the valve plug is provided with a plurality of grooves 19 in which packing material may be placed to render the upper end of the plug fluid tight.

Each annular ring, 10 to 14, inclusive, is formed at its lower end with an inwardly projecting flange 21 that embraces the valve plug 4 and has a sliding, substantially pressure-tight fit therewith. The valve plug may be grooved at the various stages 5 to 9, inclusive, in such fashion that the flow area from one stage to the next increases in a predetermined manner so that the reduction in the pressure of the fluid is accomplished in steps of either equal or progressively increasing, or progressively decreasing values. As illustrated, the valve plug is designed so that the pressure reductions at the various stages are substantially equal. As shown, more particularly by Figs. 4 to 8, inclusive, the valve plug is provided with one groove G5 at stage 5, two grooves at station 6, three at station 7, four at station 8, and five at station 9; and these grooves are so shaped and proportioned that the flow area of each stage will be such that the velocity of the fluid flowing through any one stage will be below the value at which noise and vibration occurs, which velocity may be different for different types of fluids or liquids. In the case of steam, the flow areas should be so proportioned that the velocity through any stage will not exceed approximately 1000 feet per second, for example.

Thus, the stages beginning with stage 5 and ending with stage 9 are so proportioned that each one has a flow area that will keep the velocity of the fluid passing through it at a value below that which would develop noise and vibration, and at the same time establish substantially uniform pressure reduction at the various stages.

Fluid enters stage 5 of the valve through inlet 23, passes through stages 6 to 9, inclusive, into the bottom of the bore in the valve body, thence through a side passage 24 into upwardly directed passages 25 and 26 to outlet 27. Passages 25 to 26 are employed to allow the outlet and inlet to be at the same level so that the valve may be connected into the line without offsetting the high and low pressure sections thereof. Where this is not important, the outlet of the valve may as well be at 24 or 28, which when not used may be closed with screw plugs 30 and 31, respectively.

The upper ends of passages 25 and 26 may be connected to the space above ring nuts 17 through passages 32 (only one of which is indicated) to allow such fluid as leaks past the upper end of plug 4 to escape into outlet 27.

In case the valve is to be used for reducing high pressure steam to low pressure steam, and it becomes necessary or desirable to desuperheat the steam, the valve may be provided with an inlet for water, and this inlet may be so located that the desuperheating water may be introduced into any one of the pressure-reducing stages of the valve. Such an inlet may be provided as at 34 that would introduce the water into one of the low pressure stages, say stage 8 for example, at which point the velocity of the steam would be high enough to atomize the water and thoroughly mix it with the steam. If desuperheating is not required, this inlet may be closed with a screw plug such as indicated at 30 or 31.

When the valve plug is in the position shown in Fig. 2, the valve is closed, as the lower ends of all the flow grooves G5 to G9, inclusive, are above valve flanges or seats 21 of the respective members 10 to 14, inclusive. As the plug is moved downwardly to a point where the lower ends of the grooves G5 to G9 are below seat 21, flow through the valve may take place, the maximum flow occurring when the centers of these grooves are opposite their cooperating valve seats or rings. For intermediate positions of the valve plug, the total flow area of the valve will be correspondingly less and the flow through the valve correspondingly lower. By controlling the position of valve plug 4, the flow through the valve may be regulated as desired, and for every position of the plug the pressure drops through the various stages will remain fixed and constant with respect to each other.

The valve operating mechanism 2 comprises a pressure actuated member, as for example a diaphragm 35 that is operatively connected by means of a thrust plate 36 and stems 37 to 38 to the upper end of valve plug 4.

Plate 36 is secured to the upper end of rod 37 and the plate and diaphragm 35 are disposed within a two-part housing 39, the edges of the diaphragm being clamped between the housing parts, thus providing a pressure-tight space 40 into which operating pressure is introduced through an inlet 41.

Housing 39 is carried by a support column 42 that is secured at its lower end by means of a clamping nut 43 to a bonnet 44 threaded into the upper end of valve body 3. Rod 38 passes through a stuffing box in bonnet 44 comprising a lower packing ring 45, stuffing box ring 46, an upper packing ring 47, a gland 48 and a nut 49.

Valve plug 4 is urged toward its closed position by means of coaxial coil springs 51 and 52 disposed between a plate 53 and a plate 54. Plate 53 rest on a thrust bearing 55 carried by an adjusting screw 56 that is threaded into a strut 57 formed integrally with column 42. The lower end of screw 56 is countersunk to accommodate bearing guide balls 58 for stem 37.

The upper ends of springs 51 and 52 bear against plate 54 and the thrust on this plate is transmitted to plate 36 by means of a sleeve 60 disposed about stem 37 and passing through the lower part of housing 39. Downward movement of diaphragm 35 is limited by a stop 61 carried on the inside of housing 39, and upward movement is limited by a stop 62 carried by plate 59. The lower part of housing 39 is recessed about stem 37 to accommodate bearing guide balls 63 for sleeve 60.

Fig. 1 illustrates diagrammatically the use of the pressure-reducing valve in reducing the pressure of fluid flowing from a high pressure line 64 into a low pressure line 65. The high pressure line is connected to valve inlet 23 and the low pressure line is connected to outlet 27. Where it is desired to maintain the pressure in the low pressure line substantially constant, a regulator 66 may be employed. This regulator responds to the pressure in line 65 and transmits a fluid pressure to space 40 of such value that valve plug 4 will be held in the position required to allow sufficient flow of fluid into line 65 to maintain the pressure therein substantially constant at some predetermined value.

Regulator 66 comprises a pressure-responsive element 67, such as a bellows, disposed within a pressure-tight casing 68 to which pressure from the low pressure line is transmitted by means of a pipe 69. The regulator includes an escapement valve 70 which is operated by the pressure-responsive bellows through a lever 71. Lever 71 is fulcrumed at one end as at 72 and is operatively connected to the bellows through a push rod 73, having a knife edge engagement at 74 with the lever. A spring 75 urges lever 71 in a direction opposite to that in which it tends to be moved by the bellows in response to increasing pressures.

The escapement valve comprises a valve body 76 having an exhaust port 77 that exhausts to the atmosphere, an inlet port 78 that is connected to a pipe 79 supplied with operating fluid of substantially constant pressure and an outlet port 80 connected by a pipe 81 to inlet 41 of housing 39. The valve includes a movable member 82 disposed within the valve body and which is provided with tapered surfaces 83 at its opposite ends disposed to cooperate with valve seats at the inlet and outlet ports of the valve body. The valve member is urged upwardly by means of a spring 84. When the valve member is seated on the seat of inlet port 78 the pressure in space 40 of housing 39 is at its minimum value as any fluid medium therein will exhaust to the atmosphere. When the valve member is in engagement with the seat of exhaust port 77 the pressure in chamber 40 will be at a maximum and valve plug 4 will be moved downwardly to its maximum open position.

When valve 82 occupies any intermediate position, depending upon the pressure acting on bellows 67, the pressure in chamber 40 will be of some intermediate value. Thus, as valve 82 moves from one seat to the other the pressure in chamber 40 will have a definite value, depending upon the the position of this valve with respect to the seats of exhaust and inlet port 77 and 78, respectively.

Thus, if it is desired to maintain the pressure in low pressure line 65 substantially constant at any value of "p" pounds per square inch, regulator 66 will be adjusted to be in equilibrium with this pressure; if this pressure rises, the escapement valve will be shifted to a position to lower the pressure in chamber 40 to a value that will allow valve plug 4 to move upwardly and thereby decrease the rate of flow of fluid from high pressure line 64 to low pressure line 65. If the pressure tends to decrease in low pressure line 65, the regulator will act in the opposite direction and increase the pressure in chamber 40 so that the valve plug will be moved to a position that will allow greater flow to the low pressure line and thereby raise the pressure in that line.

If the pressure-reducing valve 1 is to be used in a steam line where high pressure steam is to be reduced to some predetermined value of low pressure steam, it may be necessary to introduce water into the steam to desuperheat it. This may be accomplished by introducing water into inlet 34, and if it is desired to maintain the degree of superheat in the low pressure line substantially constant, a temperature-responsive regulator 84 may be employed to operate a valve 85 that would in turn regulate the amount of water delivered from a supply line 86 into stage 8 of the reducing valve.

Valve 85 in such case could be operated by a pressure-responsive element 87, such as a bellows, operating against a spring 88 which tends to urge the bellows upwardly, thereby urging the water regulating valve toward its open position. The temperature responsive regulator 84 would respond to the temperature of the steam in the low pressure line 65 and cause such a control pressure to be delivered to the bellows 87 that valve 85 will be in the position required to deliver the requisite amount of water to maintain the temperature of the steam at the value for which temperature-responsive regulator 84 would be set.

The temperature-responsive regulator 84 is illustrated diagrammatically and comprises a temperature-responsive mechanism 89 having its thermal element extending into the steam line 65 and having its movable element 89' connected to a lever 90 similar to lever 71 of regulator 66. The lever would operate an escapement valve 70' such as valve 70 of regulator 66. Since valve 70' is similar to valve 70, corresponding parts are designated by the same reference characters primed. If the temperature of the steam increases above the desired predetermined value, regulator 84 operates to transmit a decreased control pressure to the operating bellows 87 for valve 85, causing it to move toward its open position, thereby increasing the rate of flow of water into stage 8 of the pressure-reducing valve. If the temperature decreases, indicating that too much water was being introduced into the low pressure steam, regulator 84 so operates valve 70' that a higher operating pressure will be delivered to bellows 87. With increased pressure, bellows 87 will move valve 85 toward closed position, thereby decreasing the amount of water introduced into the steam passing to the low pressure line.

It will be apparent from the above description of the pressure-reducing valve 1-2, that this valve may be utilized in many ways and that uses for reducing fluid pressure and steam pressure are only some of its uses. It also has application as a continuous blowdown control for steam boilers. If continuous regulated blowdown is desired, the valve may be connected in a pipe line leading from an appropriate point in the boiler and the valve would be adjusted to hold valve plug 4 in the position required for any rate of blowdown as determined by the analysis of the boiler water.

Where the boiler water analysis remains fairly constant, and it is desired to regulate the rate of blowdown in accordance with the load on the boiler, valve plug 4 could be adjusted automatically in response to some function indicating the load on the boiler, as for example in accordance with variations in steam flow from the boiler.

If the valve is used to control boiler blowdown, outlet 27 will be discharging to the atmosphere or into a flash tank, but in either case the pressure at the outlet will be constant. In adapting the valve for blowdown purposes, the difference between the boiler pressure and the atmosphere or discharge pressure is determined. From this the number of stages required is determined so that the drop through any one stage will bear a fixed relationship to any other stage.

From the above it will be seen that the multistage valve in effect comprises a plurality of valves connected in series, i. e., with the outlet of one valve connected to the inlet of the next valve, etc., and a control means for all of them that controls the flow area through each simultaneously and in such fashion that the flow area of any one will bear a fixed relationship to any other for every position of the control means. Thus stages 5 to 9, inclusive, may be considered as individual valves, connected as above described and all controlled simultaneously by a control means such as plug 4.

Having thus described the invention what I claim and desire to secure by Letters Patent is:

1. A multistage fluid pressure-reducing valve comprising a valve body having a bore therein provided with a plurality of spaced valve seats, an inlet at one end of the bore and an outlet communicating with the other, said valve seats being coaxial, and a valve plug in said bore disposed to have a fluid shut-off fit with at least one of said seats when in one position, the valve plug having spaced grooved portions, each grooved portion extending lengthwise of the plug, such grooves being so spaced that when the plug is in shut-off position any grooved portion will lie between its adjacent pair of valve seats, each such grooved portion providing a flow area past its cooperating valve seat when the plug is moved out of shut-off position.

2. A multistage fluid pressure-reducing valve according to claim 1, characterized by the fact that the flow area of each succeeding grooved portion of the valve plug, starting with the one adjacent to the inlet, is greater than the one immediately preceding the same.

3. A multistage fluid pressure-reducing valve according to claim 1, characterized by the fact that the valve is provided with another inlet positioned to communicate with the space between a pair of valve seats remote from the inlet to the valve whereby another fluid may be introduced thereinto to commingle with the fluid flowing through the valve.

4. A multistage fluid pressure-reducing valve according to claim 1, characterized by the fact that the flow area of each succeeding grooved portion of the valve plug, starting with the one adjacent to the inlet, is greater than the one immediately preceding the same; and that the valve is provided with another inlet positioned to communicate with the space between a pair of valve seats remote from the inlet to the valve whereby another fluid may be introduced thereinto to commingle with the fluid flowing through the valve.

5. A valve according to claim 1 characterized by the fact that each grooved portion following the first pressure-reducing stage comprises a plurality of grooves spaced circumferentially of the plug.

6. A fluid pressure-reducing valve comprising a valve body having an inlet and an outlet, a plurality of spaced valve seats between said inlet and outlet, and a valve plug disposed to control the flow of fluid past all of the said seats, the valve plug and seats being so arranged that the flow area past any succeeding valve seat in the direction of the outlet is greater than the flow area past any preceding valve seat, said valve being provided with another inlet positioned to communicate with the space between a pair of valve seats remote from the inlet whereby another fluid may be introduced therewith to commingle with the fluid passing through the valve.

WILLIAM W. SMITH.